June 24, 1930.    L. ROUANET    1,766,359
BRAKE OPERATING DEVICE FOR STEERING WHEELS
Filed Dec. 11, 1924    2 Sheets-Sheet 1
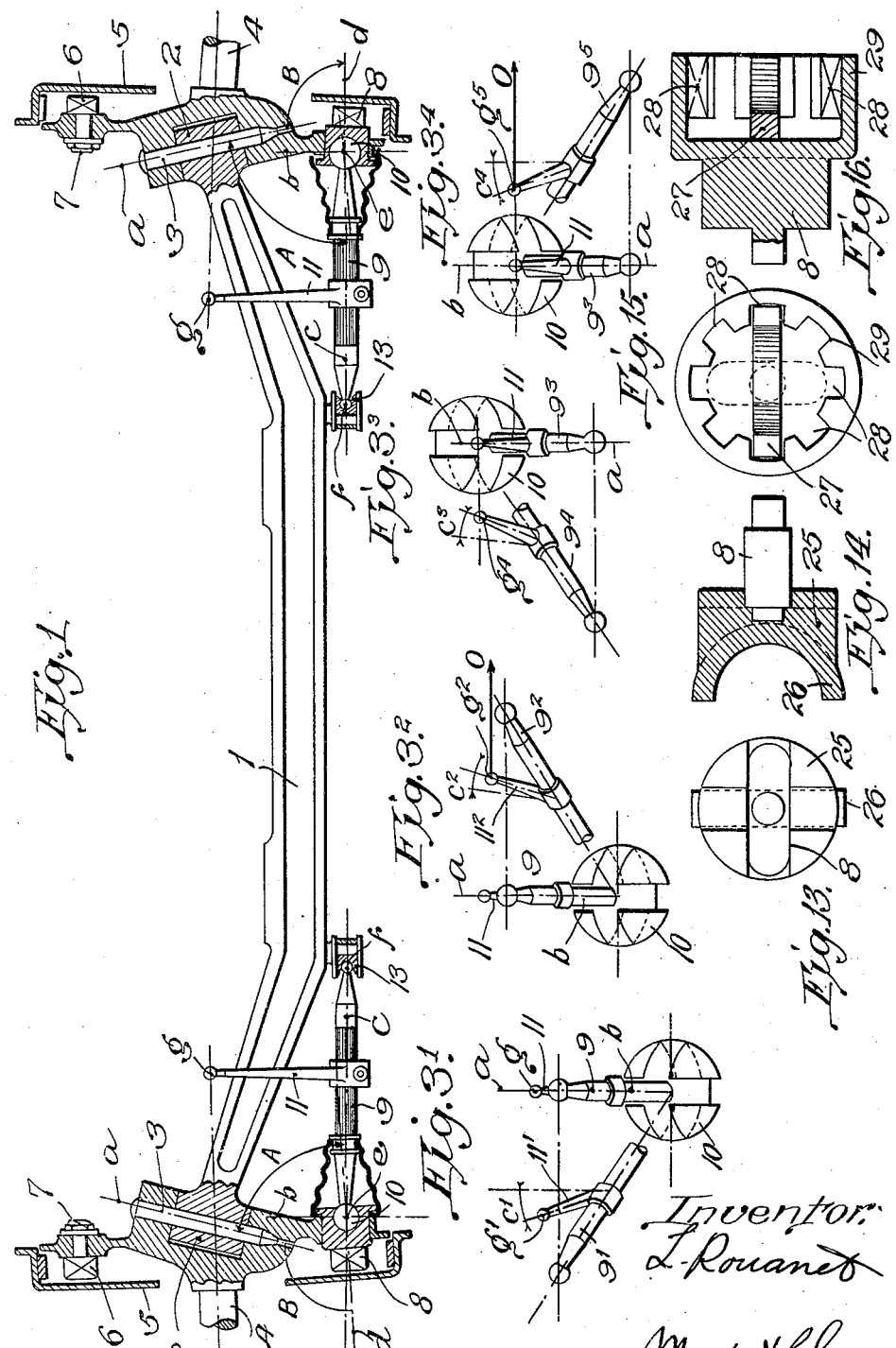

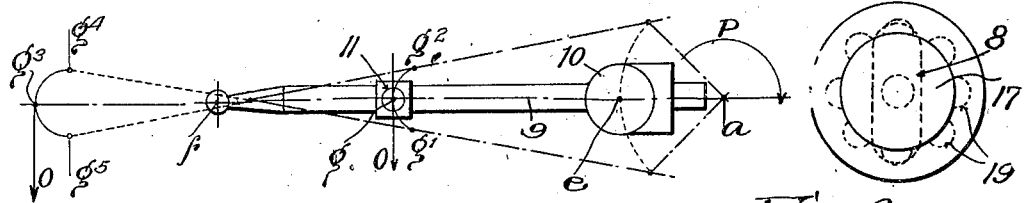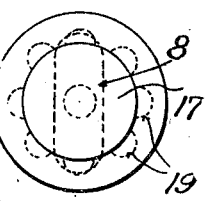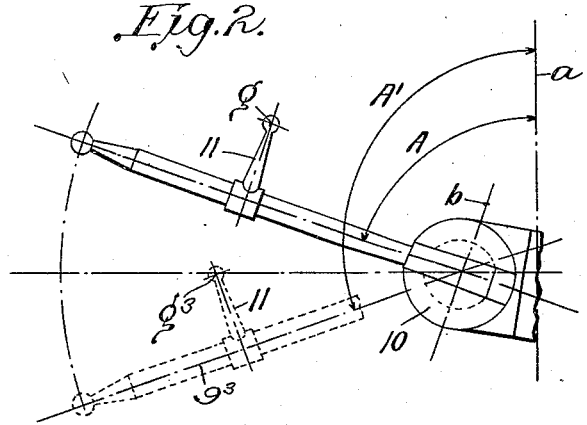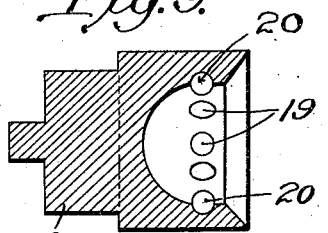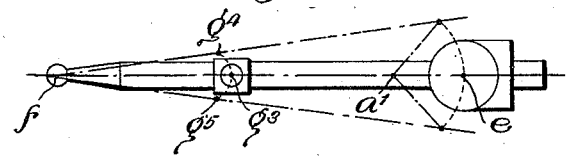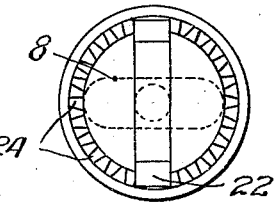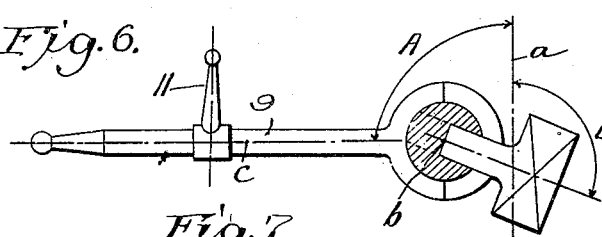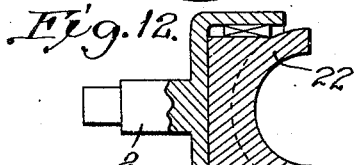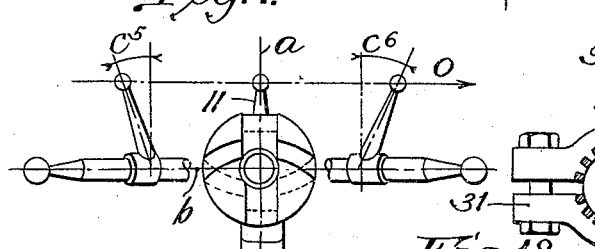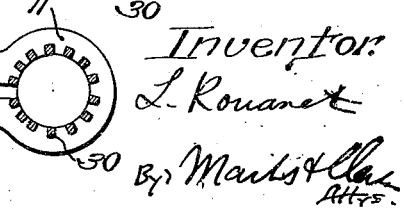

Patented June 24, 1930

1,766,359

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY

BRAKE OPERATING DEVICE FOR STEERING WHEELS

Application filed December 11, 1924, Serial No. 755,328, and in France December 20, 1923.

The present invention relates to brake operating devices of steering wheels mounted on pivoted axles and in which a series of members are supported on the vehicle axle and another series of members on the steering swivel, the connection between the two series being insured by a universal joint.

The construction of a steering axle comprising a braking device is rather complex because a perfect arrangement demands that all the pivoting spindles—those of the braking members as well as those of steering swivels—should be arranged in such a manner that the braking effect on the wheels does not interfere with the steering.

The forces capable of action on the steering must be balanced, and only a judicious and well designed arrangement of the members mounted on the steering swivels will enable such a result.

Further, the brake operating members are subject to abnormal movements, insufficiently considered in prior arrangements, which movements interfere, particularly when steering the wheels, and increase considerably with use.

Heretofore the proposed devices for operating the brakes of steering wheels mounted on pivoted axles have been ineffective, and have not given the desired results, the axles being imperfectly designed because the question has not been considered from every standpoint.

The regularity of operation of the braking arrangement necessarily depends on the operation, as a whole, of the constituent parts of the braking axle.

To obtain the necessary perfect operation, enabling a powerful progressive braking action without danger, an axle, with pivoted steering swivels and brake operating device, must constitute a well designed whole in which each of the members, individually considered, is a mechanical unit bringing to the whole a contributive part of utility in the desired operation.

The present invention has for its object improvements in or relating to the operating devices for the brakes of wheels mounted on pivoted swivels, enabling either an equalized braking action or a differential braking action to be obtained upon the wheels when said wheels are deflected.

According to the improvements of the invention the braking axle comprised two operating cams journaled in the pivoted swivels; two regulating devices enabling the braking action to be individually controlled at each end of the axle, and opposite the braking cams; two driving rods or shafts, each supported in a ball and socket joint sliding on the axle, each rod or shaft actuating its cam through an universal joint the center of which is not in line with the pivoting spindle, and two operating levers receiving the braking tensible stress and carrying the driving rods in the direction of the rotation.

The invention also relates to the particular arrangements of certain of the constituent members of the braking axle, and particularly:

First: To the particular construction of the operating cams and their actuating universal joints, and according to which these members are so shaped as to permit the connection in various relative directions.

Second: To the particular construction of the actuating rods or shafts and levers, and according to which said parts are so shaped as to permit lengthwise displacement of the said levers along the said rods or shafts, and the clamping of same in the desired positions.

The invention will be better understood with reference to the annexed drawings, showing a preferred form of the invention, in which:

Fig. 1 is a front view, taken from the rear of an axle with pivoted steering swivels, comprising the improved brake device permitting an equal braking effect on each wheel, the swivels being represented in section with parts broken away;

Fig. 2 is a diagrammatic front view of the actuating braking lever, the pivoting axis of the rod on the universal joint, the pivoting axis of the wheel, and the axis of the actuating rod being situated in the same plane during the straight displacement of the vehicle. In this figure the pivoting axis of the illustrated steering swivel has been brought back to the vertical position. Further, another position, which may be occupied by the operating braking lever relative to the pivoting axle of the wheel, has been indicated in dotted lines.

Figs. $3^1$, $3^2$, $3^3$ and $3^4$ are end views of the arrangement shown in Fig. 2 illustrating also the positions occupied by the actuating lever during a steering of the wheels, to the right and the left respectively. Similar positions, corresponding to the case in which the actuating lever assumes (when the vehicle is moving in straight line) the position similarly illustrated in Fig. 2, are represented.

Fig. 4 is a diagrammatic plan view of Fig. 2, showing the positions assumed by the central points of the parts for the positions illustrated Fig. 3.

Fig. 5 is a diagrammatic view, similar to Fig. 4, but corresponding to another case;

Fig. 6 is a view in elevation of an alternative construction in which the position of the pivoting axis of the actuating rod, relative to the universal joint, is at right angles to the plane passing through the pivoting axis of the swivel and the axis of the actuating rod, when the vehicle is moving in straight line.

Fig. 7 is an end view, corresponding to the Fig. 6, and showing two positions occupied by the members for two opposite steering directions.

Figs. 8 to 10 inclusive are views showing, respectively in section and in elevation, one form of operating cam together with the driving connection;

Figs. 11 to 16 inclusive are alternative forms of the constructions represented in Figures 8 and 9.

Figs. 17 and 18 represent, respectively in elevation and end view, another form of actuating rod and operating lever.

In the example of construction shown in Fig. 1, the front axle 1 of a vehicle has, at each end, an eye 2 disposed to receive a spindle 3, upon which is pivoted the forked swivel 4 on which rotates the steering wheel not represented.

The brake drum 5 is supported on the corresponding wheel and within which are disposed, as usual, the ordinary brake shoes (not shown), which shoes are adjustable, according to the wear of the lining, by means of an adjusting device 6 operable from the exterior, by means of a screw or similar means 7, and acting in opposition to the actuating cam 8, in order to obtain the same braking effect for a given position of the operating cam 8, notwithstanding the wear of the linings. The operating cam 8, journaled in the swivel 4, is connected with its operating rod 9 by means of an universal joint 10, the center $e$ of which is not in line with the axis $a$ of the spindle 3.

The operating lever 11, receiving the braking tensile stress at $g$, and rotating the driving rod 9, is constructed so as to be easily moved along the latter, and clamped at a predetermined point pending upon the relative positions of the various driving members and from the effect to be obtained at $g$.

The driving or operating rod 9 is supported on a knuckle 13 having a center $f$ and sustained by the axle 1 so as to be able to swing during the steering of the wheels.

The relative position of the different members of the braking device of the axle and the arrangement of the said members relative to the pivoting axis, are determined so that the steering of the wheels will cause a rotating movement of the operating levers together with a forward and backward movement of same, these two movements being combined so as to obtain the desired effect at the points of application of the braking pulls, $g$.

In the axle represented in Fig. 1, the angle A, formed between the axis $c$ of the driving rod 9 and the axis $a$ of the spindle 3, is smaller than 90°, and the axis $b$, representing the axis of articulation of the operating rod 9 on the universal joint 10, is situated in the plane containing the axis $a$ and $c$.

The different parts are represented in Figs. 2 and 3, this latter figure being an end view of Fig. 2.

In Figure 2 and in Figures $3^1$, $3^2$, $3^3$ and $3^4$, the actuating rod and the pivoted axis are again designated by references 9 and $a$ respectively, (the parts represented in Figs. 2 and $3^1$ corresponding to an arrangement in which the angle A is less than 90°, as indicated in Fig. 1; the positions indicated in dotted lines corresponding to an arrangement in which angle A is greater than 90°). The axis of articulation $b$ of the actuating rod 9 with the universal point 10 is disposed as in Fig. 1.

If Fig. 2 and Figs $3^1$, $3^2$, $3^3$ and $3^4$ are considered as relating to the wheel situated at the right hand side of the axle of Fig. 1, it must be noted that the steering movement to turn at the left side will move the driving rod 9 in position $9^1$ (Fig. $3^1$) (for the understanding of the drawing it has been supposed that the wheel remains stationary and that the axle has moved about the pivot). If, during said displacement, the cam 8 is considered as remaining in the same position, and that, consequently, a part of the universal joint remains stationary, it is to be noted that the lever 11, reaching the position $11^1$, has become angularly displaced with $C^1$.

The steering movement, to turn at the right hand side, will cause the driving rod to pass from 9, to $9^2$ (Fig. $3^2$), the operating lever 11 moving to position $11^2$ with an angular displacement of $C^2$. The angular displacements of lever 11 result (when considering the point $g$ at which the tensile stress is applied, supposing the brake pedal fixed and the braking pull directed in the direction of the arrow $o$) in an increased braking effect on the outside wheel and a reduced braking effect on the inside wheel as will be apparent from an inspection of Fig. 4, these effects having the same value upon each wheel. In the case considered, the values of the displacements of the point $g$ depend on the angle A (it will be seen in effect that, for the positions indicated in dotted lines in Figures $3^3$ and $3^4$, the displacements of $g$, from the position $g^4$ to the position $g^5$, are of lesser values than those from $g^1$ to $g^2$).

On the other hand, Fig. 4, illustrated in diagrammatic form, shows the movements in the horizontal plane.

In this plane, the concerned elements are the center $e$ of the universal joint 10; the pivoting axis $a$; the center $f$ of the knuckle of the operating rod 9 and the point $g$ at which the driving pull is applied.

From examination of Figure 4 it will be seen that during the steering movement of a wheel towards the inside of a curve, as indicated by the arrow P, the point $g$ will be moved to $g^2$, whilst, on the contrary, it will be moved to $g^1$ during the steering movement of a wheel towards the outside of the curve, that is in the reverse direction of the arrow P. Said displacements result (supposing the braking pedal fixed, and the driving pull exerted in the same direction as in Figure 3, as indicated by the arrow $o$) in an increased braking effect on the inside wheel and a smaller braking effect on the outside wheel. The values of the displacements of the point $g$ depend from the relative positions of the points $a$, $e$, $g$, $f$ (the positions $g^1$ and $g^2$ in this figure corresponding to the same positions of Figures 2 and $3^1$ and $3^2$).

The effect, on the point $g$, of the angular displacements indicated Figs. $3^1$ and $3^2$ is thus compensated by the effect, at the same point, of the displacements in forward and backward directions, as seen in Figure 4.

Thus, it will be clearly understood that, the parts being disposed as indicated in Fig. 1, a stationary position of the point $g$ (point at which the braking pull is applied) may be obtained during the steering movements, the cam 8, remaining at the same position of fastening.

An important feature of this device lies in the possibility of modifying the position of the lever 11 on the driving rod 9, thus enabling the desired compensation to be accurately obtained by adjusting the position of the point $g$ (see Figure 4).

It will also be noted that, instead of a constant braking action in any steering position, the arrangement enables a greater braking effect to be obtained on the inside wheel or, on the contrary, an increased braking effect on the outside wheel, by simply moving the lever 11 to the right or left of the balanced position obtained as above indicated. The increase in the braking effect may thus be obtained progressively, starting from the balanced state.

The positions just considered relate to the arrangement indicated in Fig. 1, but it will be understood that other alternative forms may be employed without departing from the character of the invention.

In effect, and as represented in dotted lines in Figures 2 and 3 and in Figs. $3^3$ and $3^4$, the driving rod 9 may be disposed at an angle, $A^1$, greater than 90°, from axis $a$ while the vehicle is traveling in a straight line, as indicated at $9^3$. In such a case, all other conditions remaining the same, the angular displacements of the operating lever 11 will take place when the driving rod $9^3$ moves at $9^4$ and at $9^5$ during the steering, but the directions of such displacements is here reversed. The levers 11 swing respectively through angles $C^3$ and $C^4$, bringing the point $g^3$ at $g^4$ and at $g^5$. The same operation of the axle may however be obtained, as represented in Fig. 4, in which the driving rod 9 extends from the bearing point $f$, and the point $g$ of application of the braking pull is situated at $g^3$ and will move at $g^4$ and $g^5$ during the steering movements.

The same result may also be obtained by locating the pivoting axis between the center $e$ and the point $f$, that is at $a^1$, as indicated in Fig. 5.

Another valuable alternative arrangement according to the invention may be obtained by varying the position of the axis $b$ relative to the plane containing the pivoting axis $a$ and the axis $c$ of the driving rod 9. It has been found in effect that when the axis $b$ is disposed in this plane, as in the cases of Figures 1, 2 and 3, the angular displacements of the operating lever 11—as far as the direction and the value of the same are concerned—are a function of the value of the angle A formed by the driving rods 9, and it has also been found that the value of the angle B, formed between the axis of the cam 8 and the pivoting axis $a$, has no effect upon the angular displacements of the lever 11 during the steering movements.

If, on the contrary, as in Figures 6 and 7, the axis $b$ is situated at right angles to the plane formed by axis $a$ and $c$, during the while the vehicle is traveling in a straight line, the value of the angle A (formed between the axis of the driving rod 9 and the pivoting axis $a$) has no effect upon the angular displacements of the operating lever during the steering movements of the wheels.

On the contrary, the angle B, formed between the axis of the operating key and the pivoting axis $a$, causes an angular displacement of the operating lever 11, such displacement resulting in an increased braking effect on the inside wheel, when the angle B is greater than 90° and when the braking pull has the direction of the arrow $o$. The inverted effect will be obtained when angle B is smaller than 90°. The values of the angular displacements $C^5$ and $C^6$ depend on the value of the angle B.

By reason of manufacturing conditions, the angle B is generally greater than 90°, the angular displacements obtained in such case being represented in Figure 7. Said displacements are of the same direction, and give the same results, as those considered in Fig. 3 for an angle A smaller than 90°. It will thus be evident that a combination of the arrangements illustrated in Figures 6 and 7 and in Figures 4 and 5 will give the operating results already indicated.

When the manufacturing conditions are such as to prevent the appropriate values of the angles A and B in being employed (this occurring exceptionally), the desired results may nevertheless be obtained in suitably locating the axis $b$ in the direction of rotation of the driving rod, in order that the angular displacements of the operating lever should be a function of the two angles A and B, of which the respective influence will be proportional to the position of the axis $b$ more or less similar to that of Figure 2 or of Figure 6. In such a case it will be particularly interesting to employ an orientable connecting device between the universal joint and the actuating key.

Figures 8 to 10 inclusive show a suitable arrangement permitting an adjustable orientation of the lever.

In these figures an operating cam 8 comprises a spherical housing 17 receiving a spherical part 18 of the driving rod 9. As many as possible diametrically opposite notches 19 are formed on the largest diameter of the housing 17, at right angles to the axis of the key 8. Two pivoting members 20, inserted in two opposite notches 19 and in two corresponding grooves 21 formed in the spherical part 18, insure the coupling for the rotating movement. It is thus sufficient to select the suitable notches when assembling the device so as to locate the lever in the direction procuring the desired effect during the operation of the brake.

An alternative form of arrangement is represented in Figures 11 and 12 in which an universal joint 22 comprises a toothed portion 24 fitting in a corresponding toothed portion of the operating cam 8. The number of teeth may thus be very large and permit a very precise adjustment.

According to Figures 13 and 14, two main positions of orientation are obtained by constructing the operating cam 8 in such a manner as to permit it to enter two grooves formed in part 25 of the universal joint 26.

Figs. 15 and 16 show a practical mode of assembling of the connecting device. An extension 27, formed so as to engage inside an universal joint, is mounted in the grooves 28 cut in a circular portion 29 of the operating cam 8.

Figs. 17 and 18 represent a simple arrangement enabling the position of the operating lever 11 to be adjusted on the rod 9, and consequently modifying the direction of this lever in relation to the universal joint. This arrangement permits also the longitudinal displacement of the lever 11 along the driving rod 9. To this end, the driving is effected by means of splines 30 permitting the sliding of the lever 11 on the rod 9 without rotation about the latter, the clamping in the selected position being obtained by the bolt 31.

The results obtained with the various described combinations are much better than those afforded by the actual devices in which no attention has been given to the effective contributive part that each member of the arrangement, individually considered, must give in the operation of the whole device. The somewhat rapid wear of the brake linings (generally occurring) will rapidly cause a defective operation of the device, but, according to one of the most important features of this invention, such disadvantage does not exist in the driving arrangement just described, the braking action having the same value, in spite of the wear on the linings of the brake shoes, by reason of the arrangement, in combination with the constituent parts of the braking mechanism, of controlling devices enabling each brake to be adjusted individually from the exterior.

Claims:

1. A brake device for steering wheels, comprising in combination, for each steering wheel, a brake drum, two brake shoes mounted inside the drum, an operating cam, an actuating rod supported on a knuckle sliding on the vehicle axle and actuating the operating cam by means of a universal joint the center of which is spaced from the pivoting axis of the wheel, and an operating lever receiving the brake pull and slidably mounted on the actuating rod, said operating lever having all its points located between planes at right angles to the common axis of and passing through the centers of the knuckle and of the universal joint on the actuating rod, and means on the lever to secure it in operative position.

2. In a brake device for steering wheels, one for each steering wheel, a brake drum, two brake shoes mounted inside the drum, an operating cam, a universal joint the center of which is caused to rotate about the pivoting axis of the wheel when said wheel is deflected, an actuating rod supported on a knuckle sliding on the vehicle axle, said rod being caused to rotate about its axis and to oscillate about its knuckle when the wheel is deflected, an operating lever slidably mounted on the actuating rod, said lever having all of its points located between planes at right angles to the common axis of and passing through the centers of the knuckle and of the universal joint of the actuating rod, said lever having a point which remains motionless in the direction of the braking pull when the wheel is deflected, and a braking rod transmitting said pull and connected to the said point.

3. In a brake device for steering wheels, brake drums, brake shoes mounted inside the drums, operating cams, universal joints the centers of which are caused to rotate about the pivoting axis of the wheels when said wheels are deflected, actuating rods supported on knuckles sliding on the vehicle axle, said rods being caused to rotate about their axes and to oscillate about the knuckles when the wheels are deflected, operating levers slidably mounted on the actuating rods and having all of their points located between planes at right angles to the common axis of and passing through the centers of the knuckle and of the universal joint of the actuating rod, said levers being connected to braking pull rods at predetermined points, positions for the operating levers on the actuating rods at which the predetermined points of the said levers remain motionless when the wheels are deflected, one operating lever being displaced from said position towards the universal joint and the other operating lever being displaced from the corresponding position towards the corresponding knuckle.

4. In a brake device for steering wheels, one for each steering wheel, a brake drum, two brake shoes mounted inside the drum, an operating cam, a universal joint the center of which is spaced from the pivoting axis of the wheel, an actuating rod supported on a knuckle sliding on the vehicle axle, an operating lever slidably mounted on said actuating rod said lever having all its points located between planes at right angles to the common axis of and passing through the centers of the knuckle and of the universal joint of the actuating rod and means on the lever to secure it in operative position, the axis of articulation of the actuating rod on the universal joint being disposed in the plane containing the pivoting axis of the wheel and the axis of the actuating rod when said wheel is not deflected.

5. In a brake device for steering axle, one for each steering wheel, a brake drum, two brake shoes mounted inside the drum, an operating cam, a universal joint the center of which is spaced from the pivoting axis of the wheel, an actuating rod supported on a knuckle sliding on the vehicle axle, an operating lever slidably mounted on said actuating rod said lever having all its points located between planes at right angles to the common axis of and passing through the centers of the knuckle and of the universal joint of the actuating rod and means on the lever to secure it in operative position, the axis of articulation of the actuating rod on the universal joint being at right angles to the plane containing the pivoting axis of the wheel and the axis of the actuating rod when said wheel is not deflected.

6. In a brake device for steering wheels, one for each steering wheel, a brake drum, two brake shoes mounted inside the drum, an operating cam, a universal joint the center of which is spaced from the pivoting axis of the wheel, an actuating rod supported on a knuckle sliding on the vehicle axle, the axis of articulation of said actuating rod being disposed in a plane other then the planes containing the pivoting axis of the wheel and the axis of said rod or that situated at right angles to the said second plane when the wheel is not deflected, an operating lever slidably and rotatably mounted on the actuating rod said lever having all its points located between planes at right angles to the common axis of and passing through the centers of the knuckle and of the universal joint of the actuating rod and means on said lever to secure it in either longitudinal or peripheral operative positions or both on said rod.

7. A brake device for steering wheels, comprising in combination, for each steering wheel, a brake drum, two brake shoes mounted inside the drum, an operating cam, an actuating rod supported on a knuckle sliding on the vehicle axle and actuating the operating cam by means of a universal joint the center of which is spaced from the pivoting axis of the wheel, an operating lever mounted on the actuating rod said lever having all its points located between planes at right angles to the common axis of and passing through the centers of the knuckle and of the universal joint of the actuating rod, means permitting an orientable coupling of the rod and cam, and means on the actuating rod and operating lever to secure said lever in either longitudinal or peripheral operative positions, or both, on said rod.

8. In a brake device for steering wheels, as claimed in claim 7, longitudinal grooves formed on the actuating rod, and corresponding internal toothed portion provided on the operating lever.

9. A brake device for steering wheels, comprising in combination for each steering wheel, a brake drum, two brake shoes mounted inside the drum, an operating cam, an actuating rod supported on a knuckle sliding on the vehicle axle and actuating the cam by means of a universal joint, an operating lever mounted on the actuating rod said lever having all its points located between planes at right angles to the common axis of and passing through the centers of the knuckle and of the universal joint of the actuating rod, means permitting an orientable coupling of the rod and cam, means to secure the operating lever in either longitudinal or peripheral operative positions, or both, on the actuating rod, and means supported on the wheel axle for adjusting the positions of the brake shoes according to the wear of the linings.

10. A brake device for steering wheel, comprising in combination for each steering wheel, a brake drum, two independent and loosely mounted brake shoes inside the drum, adjusting means disposed between the ends of the independent brake shoes, an operating cam disposed between the other ends of the independent brake shoes, a rod supported on the axle and actuating the operating cam by means of a universal joint the center of which is spaced from the pivoting axis of the wheel, an operating lever receiving the brake pull and causing the actuating rod to rotate, said operating lever being slidably and rotatably mounted on the said actuating rod said lever having all its points located between planes at right angles to the common axis of and passing through the centers of the knuckle and of the universal joint of the actuating rod, and means on the lever to secure it in operative position.

In testimony whereof I affix my signature.

LOUIS ROUANET.